(No Model.) 4 Sheets—Sheet 2.
F. L. O. WADSWORTH.
TELEMETER.
No. 536,555. Patented Mar. 26, 1895.
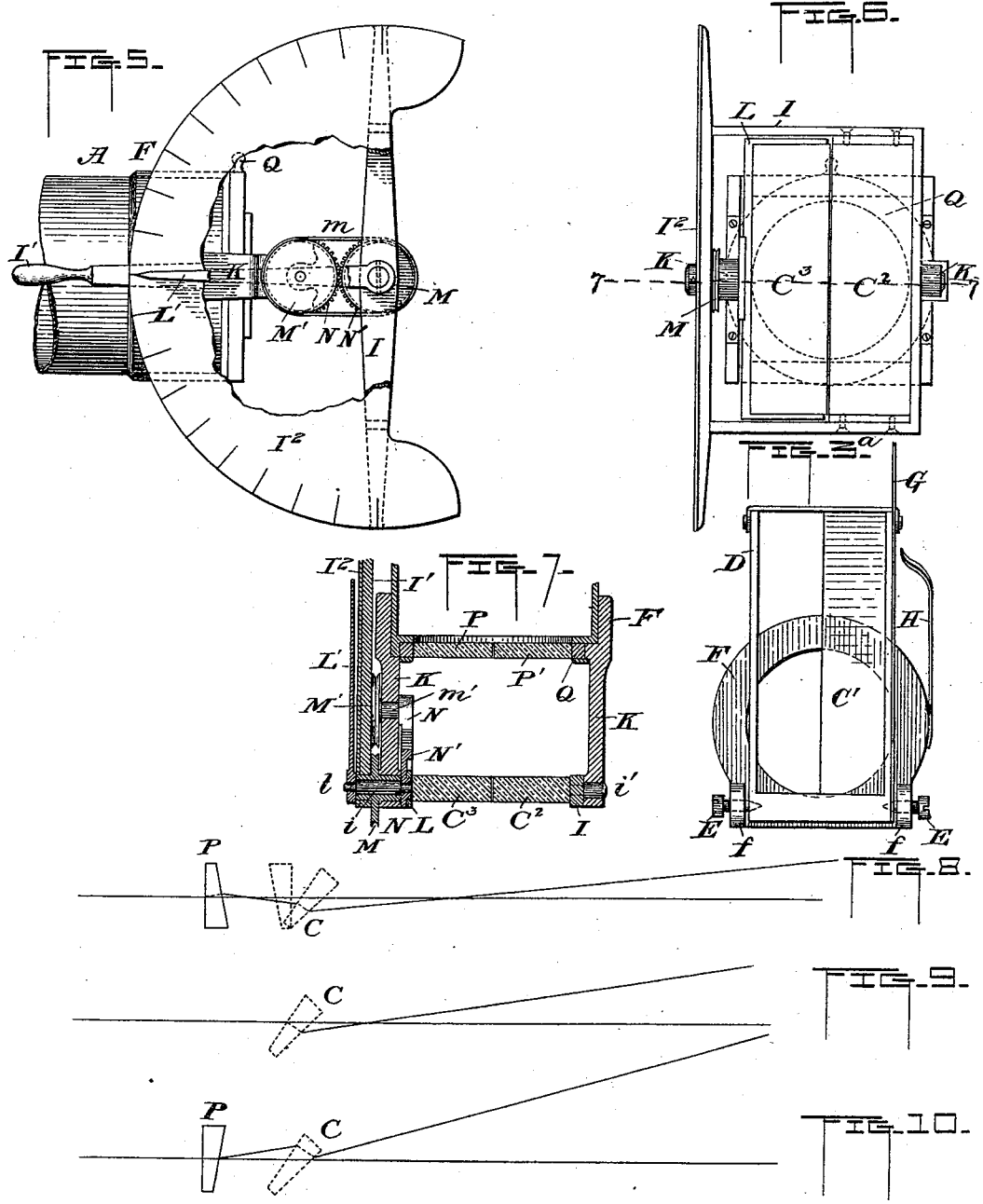

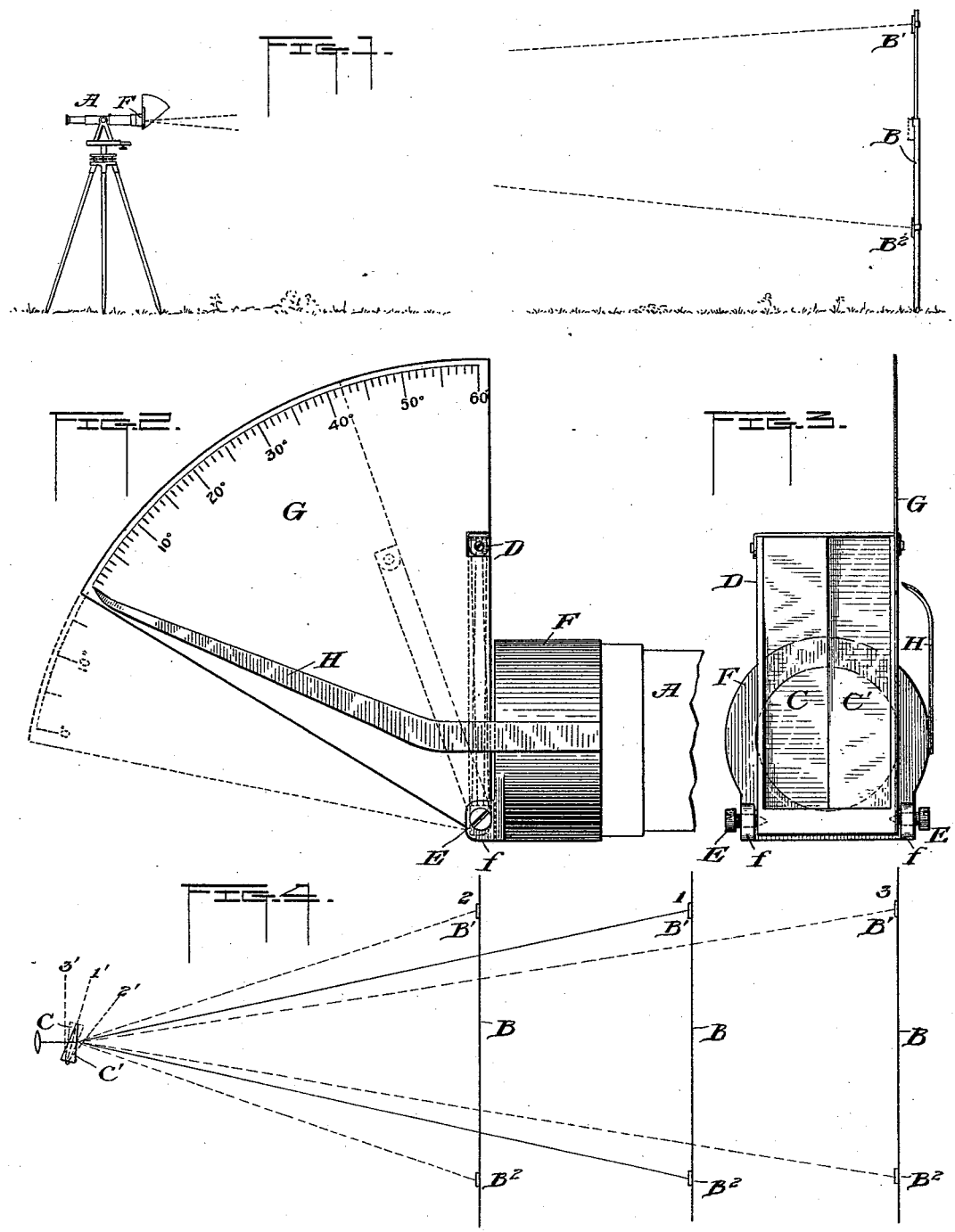

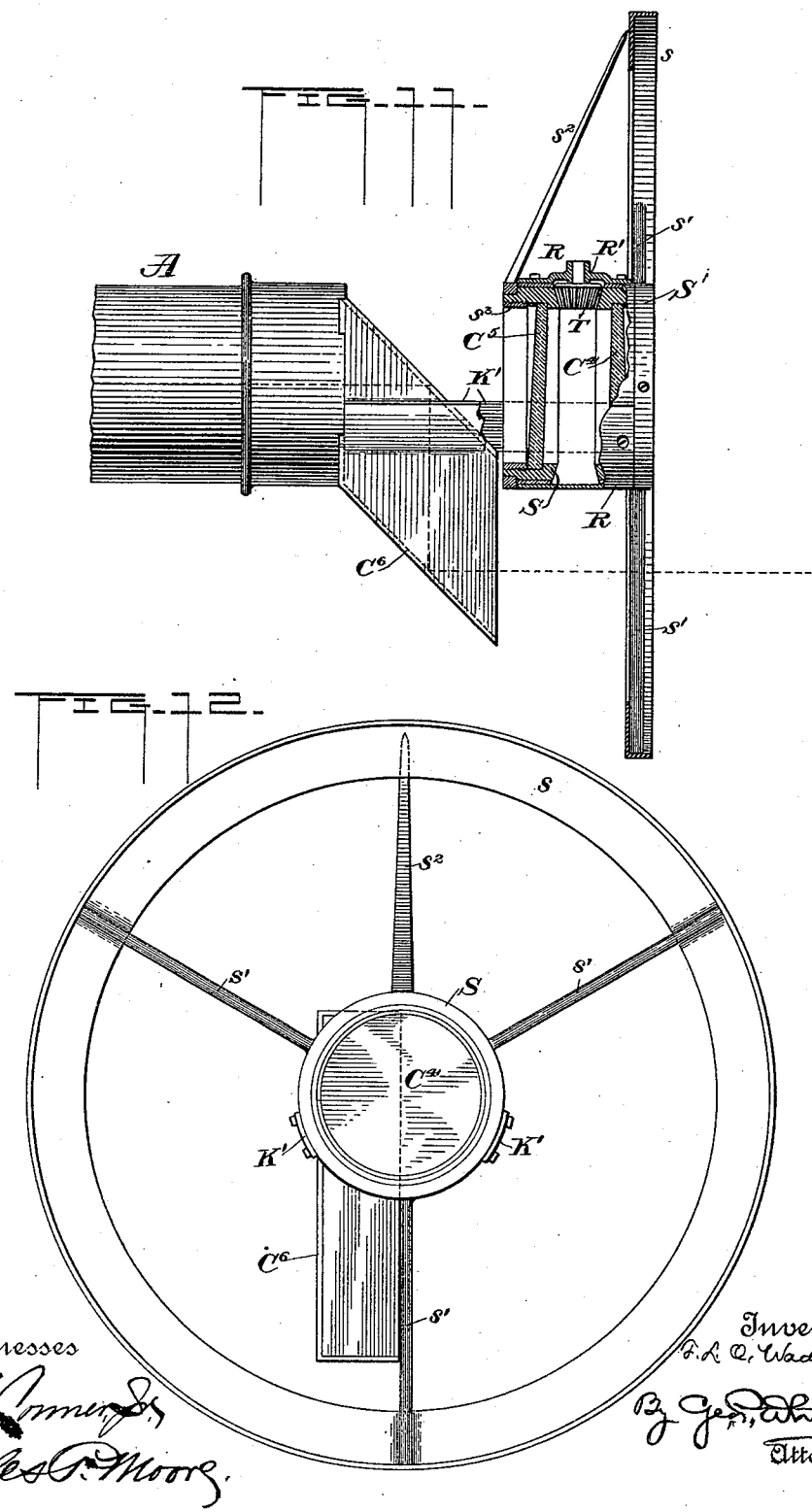

(No Model.) 4 Sheets—Sheet 4.
F. L. O. WADSWORTH.
TELEMETER.
No. 536,555. Patented Mar. 26, 1895.
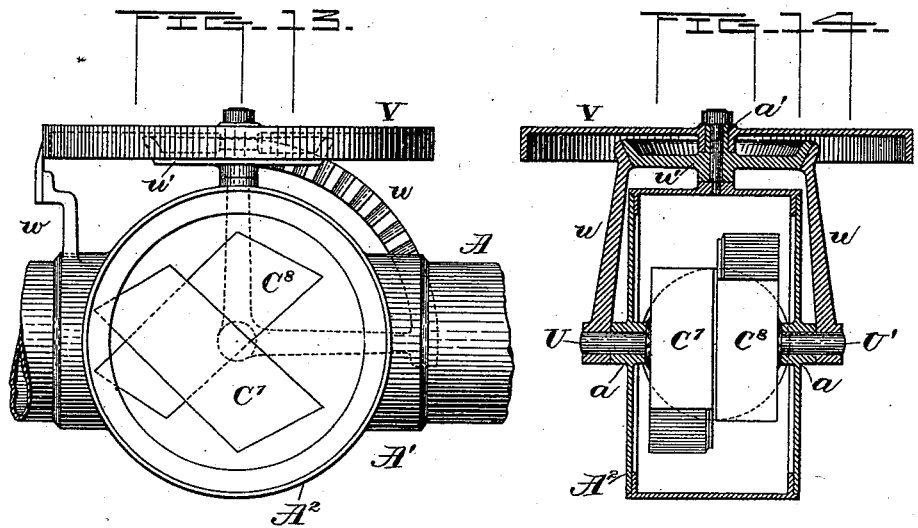
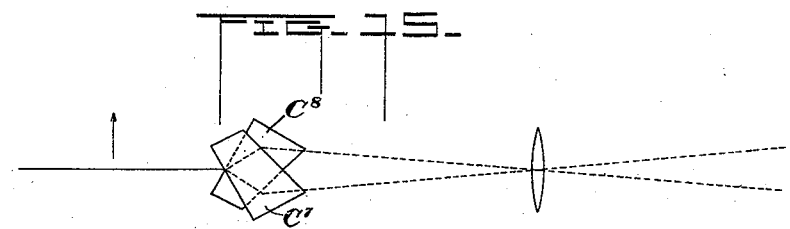
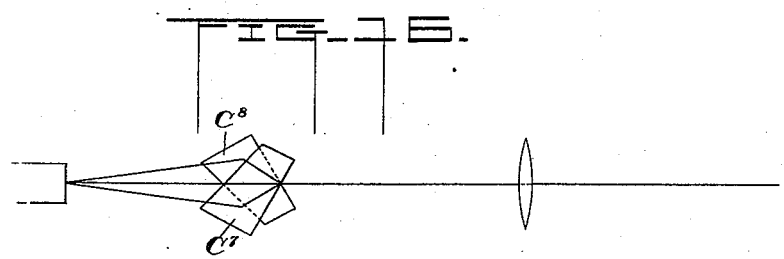

UNITED STATES PATENT OFFICE.

FRANK L. O. WADSWORTH, OF WASHINGTON, DISTRICT OF COLUMBIA.

TELEMETER.

SPECIFICATION forming part of Letters Patent No. 536,555, dated March 26, 1895.

Application filed January 12, 1894. Serial No. 496,694. (No model.)

*To all whom it may concern:*

Be it known that I, FRANK L. O. WADSWORTH, a citizen of the United States, residing at Washington, in the District of Columbia, have invented certain new and useful Improvements in Telemeters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telemeters and it consists in an improved attachment for a telescope provided with one or more movable refracting prisms, whereby when used in connection with a rod having two marks or targets fixed thereon at a predetermined distance apart, the distance of the rod from the telescope can be accurately determined by the observer, as will be hereinafter fully described.

The general method of measurement is the same as described and claimed by me in an application filed December 24, 1893. It is based on the general geometrical principle that if one side and two angles of a triangle are known the other sides can be calculated. I make the rod the known side of the triangle by fixing upon it two targets at a carefully measured distance apart, and determine the two angles at a single measurement by bringing into coincidence in the field of a telescope, placed at the vertex opposite the known side, the images of the upper and lower target in a manner to be hereinafter fully described. Specific devices for this purpose consisting of two or more movable mirrors have already been described in the application to which reference has already been made. The present invention relates to improved attachments for securing this coincidence by the use of refracting prisms in place of mirrors, and consists of a suitable cap or frame adapted to be readily attached to an ordinary telescope, and one or more refracting prisms pivoted in said frame and rotating about an axis perpendicular to the line joining the two targets. The rotation of a refracting prism about any axis parallel to its refracting edge will, as is well known, change the deviation of the rays passing through it. If then I place a refracting prism over one half the field of the telescope with its refracting edge horizontal and leave the other half of the field uncovered I shall see in looking into the field of the telescope two images of the object at which the telescope is directed, one displaced vertically with reference to the other by an angular amount equal to the deviation of the rays which have passed through the prism. By turning the prism about an axis either parallel or perpendicular to the faces and the refracting edge the vertical separation of the two images may be altered by reason of the principle just cited and in a certain position the two images will be separated by an amount equal to the length of the rod, viz: the lower target of one image will be in exact coincidence with the upper target of the other image. Then from the physical law governing the relations between the angular position of the prism and the resulting deviation of the rays which pass through it at that angle, the angular separation of the two images (viz: the angle subtended by the rod at the telescope) may be determined and from this knowing the length of the rod the distance of the rod from the telescope. In practice the angular position of the prism with reference to the axis of the telescope is indicated by a scale which may be graduated into distances in feet or yards directly if desired.

In the accompanying drawings, Figure 1 shows a telescope provided with one form of my telemeter attachment and directed toward a rod provided with two fixed targets. Fig. 2 is a side elevation of the attachment, this form of which has two refracting prisms relatively fixed and turning on the same axis. Fig. 3 is a front view of the same. Fig. 3ª shows a similar view of an attachment having only one prism. Fig. 4 is a diagram. Fig. 5 is a side elevation of an attachment having two refracting prisms rotatable in opposite directions on the same axis. Fig. 6 is a front view of the same, and Fig. 7 is a horizontal section on line 7—7 in Fig. 6. Figs. 8, 9 and 10 are diagrams. Fig. 11 is a side elevation partly in section of an attachment in which the refracting prisms are revoluble about an axis perpendicular to their refracting edges. Fig. 12 is a front elevation of the same. Fig. 13 is a side elevation of a form in which the refracting prisms are inserted between the object glass and eye piece of the telescope. Fig. 14 is a cross section of the same. Figs. 15 and 16 are diagrams.

The telescope A may be of any usual construction, and may be mounted or not upon a tripod, as desired. The rod B is provided with two targets or other marks B' B², rigidly fixed at a carefully measured distance apart, say ten or twelve feet.

The several modifications of my telemeter will be described in the order in which they are illustrated.

The attachment shown in Figs. 2 and 3 is composed of two refracting prisms C C' each covering one-half the field of the telescope, placed side by side, the thick end of one corresponding with the thin end of the other, and their meeting edges being on the vertical diameter of the object glass of the telescope.

The object of using two prisms each covering one half the field instead of the single prism covering only one half the field is twofold: first, to secure equality of illumination of the two images; second, to secure increased angular separation of the two images without increasing the refracting angle of the prism.

The prisms are firmly held in a frame D, which is hinged preferably at its lower end, on pivots E whose common axis is transverse to the line of vision and to the line joining the targets. The pivots are held in ears $f$ on a short tube F, which is fitted to slip snugly over the large end of the telescope. Any other suitable mode of securing the attachment to the telescope may be used, care being taken that the axis of the pivots E shall be not only transverse to the line of vision but also perpendicular to the line joining the targets B' B².

To measure the angular movement of the frame D, a scale G and index H are provided, one fastened rigidly to the frame D and the other to the tube F. In the drawings, the scale is shown attached to the frame and the index to the tube; but their relative positions may be changed if desired. When the prisms are vertical or at right angles to the line of vision, the index stands at zero, as shown in Fig. 2.

It is assumed that the index of refraction of the prisms, and the angle between the two faces of each, are known. Knowing these and also the minimum deviation of the prism, the angle of divergence of the ray through each prism can be calculated for each degree of inclination of the frame D as shown by the scale G. The mathematical formula for this calculation is well known and need not be given here. Having determined these angles, and knowing the fixed base B' B², the distances corresponding to the degrees on the scale G can be readily calculated, and if desired they may be entered on the scale. In order, therefore, to measure a distance from the telescope to the rod, it is simply necessary to observe the rod through the telescope and then turn the frame D on its pivots until one of the images of the upper target coincides with the other image of the lower target, when the index H will indicate on the scale the distance sought. Thus, in Fig. 4, with the rod at station 1, the target will coincide with the prisms tilted to position 1'. If the rod is moved nearer, as to station 2, the frame D will have to be tilted still farther to position 2'. For a more distant station, as 3, the frame will stand at 3'.

It is evident that the greatest distance which can be measured with a given set of refracting prisms is that at which the rod subtends the angle of deviation produced by the prisms in their zero position. To increase this distance one of the prisms as C may be made removable. The angular separation of the images will now be half as great as before, and the maximum distance that can be measured will be doubled. Thus with a prism of one degree giving a minimum angular deviation of about thirty feet and a rod twelve feet long I can measure a maximum distance of about fourteen hundred feet.

With the attachment shown in Figs. 2 and 3, the images must be observed exactly in the center of the field of the telescope, since any deviation of the line of sight from the axis of the telescope is equivalent to a change in the position of the prisms. In order to overcome this objection and render the action of the prisms independent of the position of the axis of the telescope I have devised the modification shown in Figs. 5, 6 and 7. The prism C² is here held in a frame I which is journaled on trunnions $i\,i'$ in arms K projecting in front of the object glass of the telescope. The frame may have a rearwardly extending handle I' to enable it to be turned more readily. A graduated sector scale I² is attached to the frame I. The other prism C³ is held in a frame L fitting inside the frame I and supported on a short shaft $l$ journaled concentrically in the hollow trunnion $i$ of the frame I. The outer end of the shaft carries an index L' moving over the scale I². On the trunnion $i$ is keyed a grooved pulley M which is connected by a belt $m$ with a similar pulley M' on a short shaft $m'$ journaled in one of the arms K and carrying on its inner end a sector gear N, which meshes with a similar gear N' on the inner frame L. From this, or any other arrangement of equivalent mechanism to produce the same result, it follows that when the frame I and its prism are turned in one direction, the frame L and its prism are turned in the opposite direction, the angle of divergence between them being indicated by the relative positions of the scale I² and index L'. Furthermore, since the coincidence of the images of the targets depends with this attachment, upon the angle between the two prisms, the line of sight may be shifted somewhat with reference to the attachment without affecting the apparent superposition of the images.

The range of both the attachments described above may be greatly increased by the interposition of a second refracting prism or set of prisms between the movable prism and the object glass of the telescope. In Fig. 7 these prisms P P' are shown in section, held in a frame Q, which slides in grooves in the frame F just in front of the telescope. They are so arranged that their thick ends may be made to stand opposite the thin ends of prisms C² C³, or vice versa, as shown in Figs. 8 and 10, the frame Q being removable and reversible, end for end. In the first position, the divergence of the rays produced by passing through C² and C³ is reduced again by P and P', so that the movable prisms must be turned through a larger angle when the targets are at a considerable distance, than they would if the prisms P'P' were not used. There is therefore, less liability of error in getting a reading at long distance, and a possibility of securing coincidence at any distance up to ∞. For intermediate distances, the telemeter may be used without the removable prisms, while for shorter distances they may be inserted in a reversed position, as shown in Fig. 10 so as to secure the angular divergence. This feature of a removable and reversible prism is applicable to the attachment shown in Figs. 2 and 3, and also to a telemeter having but a single rotatable prism.

In Figs. 11 and 12 is shown a modification in which the refracting prisms rotate about an axis perpendicular to the refracting edge instead of parallel to it. As in this case the prisms cannot well be arranged to cover half the field they are made to cover the whole field. A double total reflection prism C⁶ is then arranged to cover one half the field as shown, the object of this prism being to laterally divert the rays which pass through it (as shown by the dotted lines) and therefore prevent the shifting of this image by the motion of the prisms, the image formed by the rays which pass through the prisms being alone affected.

The construction of the particular mechanism shown is as follows: At the forward ends of two arms K' is secured a tubular support R in which are rotatably sleeved two annular frames S S', one in front of the other and preferably concentric with the axis of the telescope. The adjacent edges of these frames are cut into bevel gear teeth to mesh with a similar pinion T journaled in a suitable bearing R' on the holder R. One of the frames carries an annular scale, preferably a rim $s$ attached to thin spokes $s'$. The other frame carries an index $s^2$ co-operating with the scale. When one frame is rotated in one direction the other rotates in the opposite direction, and the relative angular movement is shown by the index and scale. In each frame is mounted a refracting prism, which may be clamped against a shoulder in the frame by a threaded ring $s^3$ screwed into the frame. When these prisms C⁴ C⁵ stand as shown in Fig. 11, that is, with their refracting edges turned in the same direction the ray of light passing through them is deviated from a straight path by an amount depending on the angle of the prisms, this angular deviation being the maximum which is desired, viz: the angular value of the rod at the least distance. Upon rotating the prisms on their common axis it will be readily seen that the angle of the combination and therefore the deviation of the ray is continually diminished in a vertical direction while remaining constant and equal to zero in a horizontal direction until, when each of the prisms has been moved through ninety degrees, (viz: when their relative angular movement as indicated by the scale and pointer is one hundred and eighty degrees,) their refracting edges are turned in opposite directions and, if the two prisms have the same refracting angle, the effective angle of the combination is zero, i. e., there is no deviation of the ray which passes through them. The relation between the angular motion of the prisms and the deviation of the refracted ray can be readily calculated as before and from this relation together with the known length of the rod the distance of the latter can readily be determined, as hereinbefore explained, a scale of feet or yards being engraved directly on the scale $s$ if desired.

A still further modification of my invention is shown in Figs. 13 and 14, where the prisms are interposed between the object glass and the eye piece of the telescope. In the tube of the telescope is incorporated a short section A', which may be made removable if desired, comprising a casing A². preferably cylindrical. In each side of the casing is a bearing $a$, said bearings receiving short shafts U U', the axes of which are in line and lie transverse to the line of sight and to the line joining the targets on the rod. On the inner end of each shaft is secured a thick refracting prism said prisms being lettered respectively C⁷ C⁸, and each covering one half the field of the telescope and rotating on a line near their front edges, as shown in Fig. 13. On the outer end of each shaft is a gear or segment gear $u$, meshing with an intermediate gear $u'$ journaled on a stud $a'$ projecting from the casing. Attached to the gear $u'$ is a disk V having a graduated rim. An index W is secured to the casing or to tube A' adjacent to the edge of the disk. By turning the disk the prisms are rotated in opposite directions, through ninety degrees or less, from the zero position shown in Fig. 16 in which the two images of the rod are in exact coincidence and form a single image, to that of maximum divergence of the images shown in Fig. 15. The distance of the rod when the images coincide, can be read on the graduated disk as before. By a proper relation between the thickness and the refracting angle of the prisms I may considerably vary the angular position required for exact superposition of the two images.

It will be understood that the essential point of my invention is the employment in connection with a portable telemeter rod or base of a device attachable to any ordinary telescope consisting of two or more refracting prisms which by their rotation on an axis either parallel or perpendicular to their refracting edges and transverse to the line joining the two targets, may be made to measure at one setting the angular value of the rod or base at the observing instrument and thus afford me at once the distance when I know the length of the rod.

I do not confine myself to the special form of construction nor to the special arrangement of prisms which I have shown and described as many other forms have been devised by me for accomplishing the object aimed at and only typical forms of the telemeter have been shown in the drawings.

For short distances the targets need not be placed so far apart as suggested above; or in order that one rod may be made to answer for all distances an extra target may be placed between the other two, as shown dotted in Fig. 1.

Having thus described my invention, what I claim is—

1. The combination with a telescope and with a portable telemeter rod or base of known length of a refracting prism or prism rotatable on an axis perpendicular to the rod, substantially as described.

2. The combination with a telescope, of a refracting prism covering half the field and rotatable on an axis transverse to the line of sight which passes through the prism, substantially as described.

3. The combination with a telescope of two prisms, each covering half the field, the thick end of one lying adjacent to the thin end of the other, and rotatable on an axis transverse to the line of sight, substantially as described.

4. The combination with a telescope, of two prisms, each covering half the field and rotatable on an axis transverse to the line of sight, and a scale and index for indicating the angular movement of said prisms, substantially as described.

5. A telemeter apparatus consisting of a rod provided with two fixed targets a telescope and a tube adapted to slip over the end of the telescope, a frame pivotally mounted therein on an axis perpendicular to the line joining the targets, and a prism mounted in said frame, substantially as described.

6. The combination with a telescope, of two prisms, independently rotatable on a common axis transverse to the line of sight, substantially as described.

7. In a telemeter, the combination with two prisms independently rotatable on a common axis, transverse to the line of sight, of means for simultaneously rotating them in opposite directions, substantially as described.

8. In a telemeter, the combination with a suitable support, of a frame journaled on an axis transverse to the line of sight, a second frame journaled concentrically therewith, gearing connecting the two frames to cause them to move in opposite directions and a prism mounted in each frame, substantially as described.

9. In a telemeter, the combination with a prism rotatable on an axis transverse to the line of sight, of a second prism adapted to be inserted and removed from a position in line with the first prism, substantially as described.

10. In a telemeter, the combination with a prism, rotatable on an axis transverse to the line of sight, of a second prism, adapted to be placed in line with the first, and reversible in that position, substantially as described.

11. In a telemeter, the combination with a prism rotatable on an axis transverse to the line of sight, of a second prism adapted to be inserted in line with the first, and with either of its faces perpendicular to the line of sight, substantially as described.

12. In a telemeter, the combination with the frame F carrying a prism rotatable on a transverse axis, and having grooves to the rear of said axis, of a frame Q adapted to slide in said grooves and carrying a prism, substantially as described.

13. In a telemeter, the combination with the arms K, of the frame I journaled therein, the frame L journaled on a shaft concentric with the trunnions of the frame I, gearing connecting the two frames, a scale attached to one frame, and an index attached to the other frame, substantially as described.

14. The combination with a telescope, of a frame adapted to slip over the objective, and a refracting prism pivoted in said frame on an axis perpendicular to the vertical diameter of the field, substantially as described.

15. The combination with a telescope, of a frame adapted to slip over the objective, and a refracting prism covering half the field to one side of a vertical diameter thereof, and rotatable on an axis transverse to said diameter, substantially as described.

In testimony whereof I affix my signature in presence of two witnesses.

F. L. O. WADSWORTH.

Witnesses:
   GEO. P. WHITTLESEY,
   FRANK D. BLACKISTONE.